United States Patent
Hadian et al.

(10) Patent No.: US 7,068,470 B1
(45) Date of Patent: Jun. 27, 2006

(54) COMPOSITE HEAD ARM ASSEMBLY WITH THERMAL CONTROL OF GRAM LOAD

(75) Inventors: Jafar Hadian, Cupertino, CA (US); Tadashi Yogi, San Jose, CA (US); Shuyu Zhang, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 178 days.

(21) Appl. No.: 10/092,453

(22) Filed: Mar. 6, 2002

Related U.S. Application Data (60) Provisional application No. 60/304,145, filed on Jul. 9, 2001.

(51) Int. Cl.
*G11B 5/48* (2006.01)

(52) U.S. Cl. .................................. 360/244.8
(58) Field of Classification Search .............. 360/244.8
See application file for complete search history.

(56) References Cited

U.S. PATENT DOCUMENTS

| | | | |
|---|---|---|---|
| 5,742,452 A * | 4/1998 | Simmons et al. | 360/246.1 |
| 6,236,143 B1 * | 5/2001 | Lesieutre et al. | 310/331 |
| 6,307,719 B1 * | 10/2001 | Mallary | 360/294.7 |
| 6,501,625 B1 * | 12/2002 | Boismier et al. | 360/294.7 |
| 2002/0024774 A1 * | 2/2002 | Berger et al. | 360/294.7 |

FOREIGN PATENT DOCUMENTS

DE     3844669 A * 6/1990

* cited by examiner

*Primary Examiner*—David Davis
(74) *Attorney, Agent, or Firm*—James P. Broder; Steven G. Roeder (57) ABSTRACT

A disk drive includes a drive housing, a storage disk coupled to the drive housing and a head arm assembly coupled to the drive housing. The head arm assembly includes an adjuster and a slider coupled to the adjuster. As provided herein, the adjuster changes the gram load that is applied to the slider as the temperature near the adjuster changes. In one of the embodiments, the adjuster increases the gram load that is applied to the slider as the temperature near the adjuster decreases.

41 Claims, 11 Drawing Sheets

COMPOSITE HEAD ARM ASSEMBLY WITH THERMAL CONTROL OF GRAM LOAD

RELATED APPLICATION

This application claims the benefit on U.S. Provisional Application Ser. No. 60/304,145, filed on Jul. 9, 2001, the contents of which are incorporated herein by reference.

FIELD OF THE INVENTION

The present invention relates an apparatus and method for controlling the gram load of a head arm assembly of a hard disk drive.

BACKGROUND

Magnetic recording hard disk drives are widely used in computers and data processing systems for storing information in digital form. These disk drives commonly include one or more rotating storage disks and one or more head arm assemblies. Each storage disk typically includes a plurality of tracks. Each head arm assembly includes one or more arm beams (sometimes referred to as actuator arms) and one or more head gimbal assemblies. Each head gimbal assembly includes a load beam, a base plate that secures the load beam to the arm beam, a slider, a flexure that connects the slider, and electrical conductors. The slider includes a data transducer and an air bearing surface.

The rotation of the storage disk causes the slider to ride on an air bearing a distance "h" from the storage disk. The distance "h" is referred to as the "flying height" of the slider and represents the position that the slider occupies when the storage disk is rotating during normal operation of the disk drive. Because of the cantilever spring action of the load beam, a force, commonly referred to as the gram load, is transmitted to the slider and is exerted on the air bearing. The distance between the air bearing surface of the slider and the surface of the actuator arm connected to the suspension is commonly referred to as a Z height. The pitch of the slider is commonly referred to as the pitch static attitude (PSA) of the slider and the horizontal roll of the slider is commonly referred to as the roll static attitude (RSA) of the slider.

The need for increased storage capacity, compact construction, and reduced cost has led to disk drives having fewer storage disks, with each storage disk having increased track density. As track density increases, it is necessary to decrease the flying height of the slider, have tighter control on the flying height and maintain the flying height within a certain range. For example, if the flying height is too high, the quality of the data transferred to and from the storage disk is degraded. Alternately, if the flying height is too low, the slider can contact the storage disk during operation. This can damage the slider, the storage disk, and/or may generate particles that would drastically shorten the life of the drive. As a result thereof, accurately controlling the flying height of the slider is critical to the accurate transfer and/or retrieval of information from the storage disk.

The flying height of the slider is influenced by a number of factors, including the rotation speed of the storage disk, the design of the air bearing surface of the slider, the pitch static attitude, the roll static attitude, the gram load, the Z height, and temperature within the drive. For example, as temperature changes, the shape of the slider changes. In some drives, this change in shape causes the flying height of the slider to be greater at a lower temperature than the flying height is at a higher temperature.

The temperature within the drive is primarily influenced by the environmental temperature, e.g. the room temperature, and the usage of the drive. As an example, during operation, the temperature within the drive can be approximately 5° C. Alternately, with a different room temperature and/or under different operating conditions, the temperature within the drive can be approximately 25° C. In certain drives, the flying height of the slider in the drive at 5° C. is substantially higher than the flying height of a drive at 25° C.

As a result thereof, the flying height of the slider at lower temperatures can be too high and the flying height of the slider at higher temperatures can be too low. This limits the range of temperatures that the drive can accurately and safely operate.

In light of the above, the need exists for a way to maintain the flying height within a desirable range over a relatively large temperature range, including relatively low temperatures and relatively high temperatures. Yet another need exists to provide a way to control the gram load at various temperatures. Another need exists to provide a disk drive having improved performance reliability when exposed to a wide range of environmental conditions.

SUMMARY

The present invention is directed to a disk drive that includes a drive housing, a storage disk coupled to the drive housing and a head arm assembly coupled to the drive housing. The head arm assembly includes an adjuster and a slider coupled to the adjuster. As provided herein, the adjuster automatically changes the gram load that is applied to the slider as the temperature near the adjuster changes. In one of the embodiments, the adjuster increases the gram load that is applied to the slider as the temperature near the adjuster decreases. The change in gram load with temperature allows for control over the flying height of the slider as temperature changes.

In one embodiment, the adjuster is a composite that includes a first layer and a second layer that is secured to the first layer. The first layer is made of a material having a coefficient of thermal expansion that is different from a coefficient of thermal expansion of the second layer. In one embodiment, the coefficient of thermal expansion of the first layer can be greater than the coefficient of thermal expansion of the second layer. For example, the coefficient of thermal expansion of the first layer can be at least approximately ten percent greater to approximately ten times greater than the coefficient of thermal expansion of the second layer. For more specific examples, the coefficient of thermal expansion of the first layer can be at least approximately ten percent, twenty-five percent, fifty percent, seventy-five percent, or one hundred percent greater than the coefficient of thermal expansion of the second layer.

The present invention is also directed to a method for manufacturing a disk drive and a method for controlling flying height. The method includes the step of thermally controlling the flying height of the slider having a head arm assembly with a variable gram load.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention improves the control over the flying height of a slider in a disk drive over a range of temperatures, including relatively high temperatures and relatively low temperatures. As discussed below, the present invention thermally adjusts the gram load as temperature changes to maintain the slider within a desired flying height range.

Figure 1:
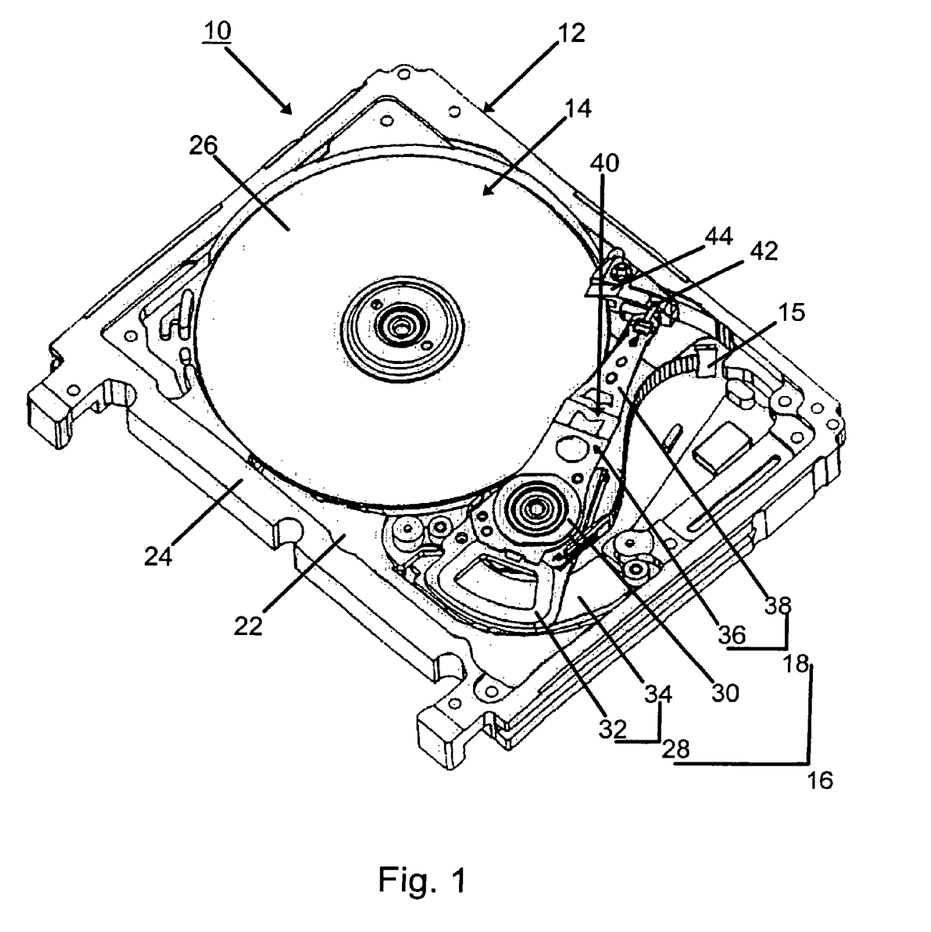
FIG. 1 is a perspective view of a disk drive having features of the present invention.

Referring initially to FIG. 1, a disk drive 10 according to the present invention includes (i) a drive housing 12, (ii) a disk assembly 14, (iii) a drive circuitry 15, and (iv) a head actuator assembly 16 including one or more head arm assemblies 18. The drive housing 12 retains the various components of the disk drive 10. The drive housing 12 can include a base 22, four (4) side walls 24 and a cover (not shown).

The disk assembly 14 can include one or more magnetic storage disks 26. Each storage disk 26 can include a data storage surface on each side or only on one side. In FIG. 1, the disk assembly 14 includes one storage disk 26 having a single storage surface on the top of the storage disk 26. The disk assembly 14 also includes a spindle motor (not shown) that rotates the one or more storage disks 26.

The head actuator assembly 16 includes an actuator motor 28, an actuator hub 30, and one or more of the head arm assemblies 18. The actuator motor 28 moves the actuator hub 30 and the one or more head arm assemblies 18 relative to the disk assembly 14. In FIG. 1, the actuator motor 28 includes a coil 32 secured to the actuator hub 30 and a pair of spaced-apart magnets 34 (only one magnet is illustrated in FIG. 1 for clarity). The actuator hub 30 is rotatably mounted to the base 22. Each head arm assembly 18 includes one or more arm beams 36 and one or more head gimbal assemblies 38. In FIG. 1, the head actuator assembly 16 includes only one head arm assembly 18, and that head arm assembly 18 includes only one head gimbal assembly 38. Alternately, for example, the head actuator assembly 16 can include a plurality of the head arm assemblies with each head arm assembly having up to a pair of head gimbal assemblies.

The arm beam 36 is secured to and cantilevers away from the actuator hub 30 and the head gimbal assembly 38 is secured to and cantilevers away from a distal end of the arm beam 36. A number of embodiments of the head arm assembly 18 are provided herein. In each embodiment, the arm beam 36 and/or the head gimbal assembly 38 includes an adjuster 40 that causes the gram load to change with the temperature so that the flying height is maintained within a desirable range. As an example, the adjuster 40 increases the gram load as the temperature decreases to maintain flying height within the desired range.

It should be noted that the amount of gram load change can be optimized and controlled by the location of the adjuster 40, the size of the adjuster 40, and the materials utilized in the adjuster 40. In the embodiment illustrated in FIG. 1, the adjuster 40 is part of the head gimbal assembly 38. Alternately, the adjuster 40 can be part of the actuator arm 36. Further, the present invention could utilize multiple adjusters 40.

Additionally, the head gimbal assembly 38 can include a lifting feature 42 that engages a ramp 44 that is positioned near the disk assembly 14. The ramp 44 can be positioned near an outer diameter of the storage disk 26 as illustrated in FIG. 1 or near an inner diameter of the storage disk 26.

Figure 2A:
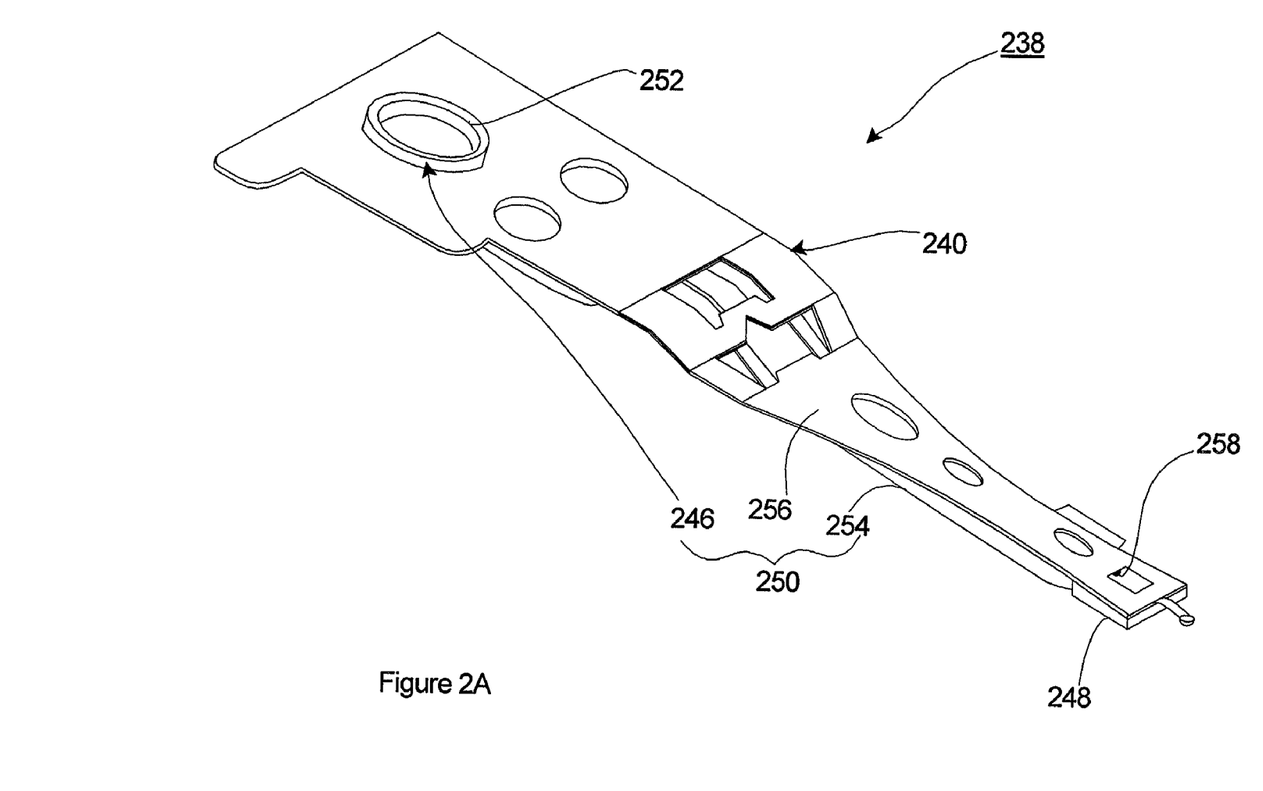
FIG. 2A is a perspective view of a head gimbal assembly of FIG. 1.

FIG. 2A illustrates a top perspective view of a first embodiment of the head gimbal assembly 238. In this embodiment, the head gimbal assembly 238 includes a slider 248, and a suspension 250. Further, the adjuster 240 is part of the suspension 250.

The slider 248 includes one or more fluid bearing surface (not shown), a write head (not shown), and a read head (not shown). Rotation of the storage disk 26 (illustrated in FIG. 1) causes the slider 248 to fly at a predetermined flying height spaced apart from the storage disk 26. The flying height, for example, can be approximately 20 nanometers or less to ensure accurate data transfer. The flying height of the slider 248 is controlled by many factors, including the rotation speed of the storage disk 26, the design of the fluid bearing surface, the design of the suspension 250, the Z-height, the gram load, the pitch static attitude, the roll static attitude of the slider 248 and the temperature inside the drive. The present invention thermally controls the gram load applied to the slider 248. This reduces the influence of temperature on the flying height.

The suspension 250 includes a base plate 246, a flexure 254, and a load beam 256. The base plate 246 secures the load beam 256 to the arm beam 36 (illustrated in FIG. 1). In FIG. 2A, the base plate 246 includes a tubular shaped, base plate hub 252 that fits within an aperture at the distal end of the arm beam 36. The base plate hub 252 is radially expanded to secure the suspension 250 to the arm beam 36. Alternately, the suspension 250 can be secured to the arm beam 36 in a different fashion, such as a screw, a weld or an adhesive.

The flexure 254 secures the slider 248 to the load beam 256. The flexure 254 includes a plurality of electrical traces that electrically connect the slider 248 to the drive circuitry 15 (illustrated in FIG. 1). Alternately, these electrical connections may be provided by other means. The suspension 250 also includes a load dimple 258 that allows the slider 248 to pivot. The load beam 256 is flexible in a direction perpendicular to the storage disk 26 and acts as a spring for supporting the slider 248. In this embodiment, the adjuster 240 is part of the load beam 256.

Figure 2B:
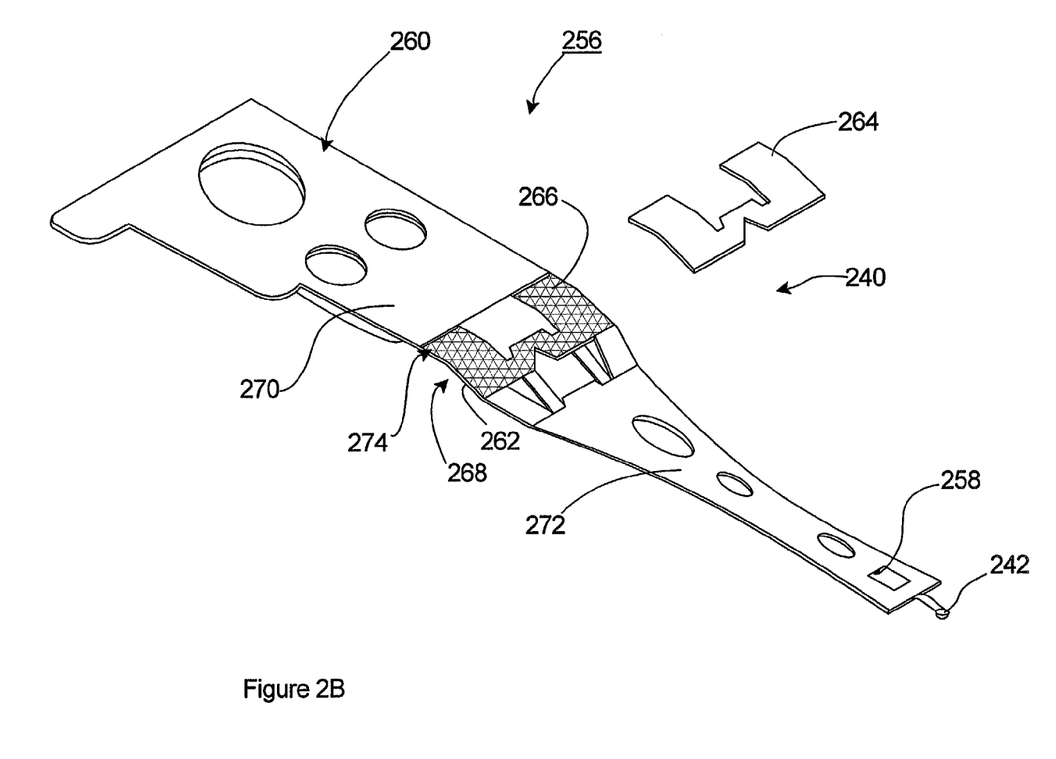
FIG. 2B is an exploded perspective view of a load beam from FIG. 2A.

FIG. 2B is an exploded perspective view of the load beam 256 of FIG. 2A including the load dimple 258. In this embodiment, the load beam 256 includes (i) a beam body 260, a portion of which defines a first layer 262, (ii) a second layer 264, and (iii) a securer 266 that secures the layers 262, 264 together. In this embodiment, the first layer 262, the second layer 264 and the securer 266 cooperate to define the adjuster 240. Alternately, the adjuster 240 can include more than two layers.

The beam body 260 includes a bend 268 that divides the beam body 260 into a first region 270 and a second region 272. The first region 270 is somewhat flat beam shaped and includes a proximal area that is secured to the actuator arm 36 (illustrated in FIG. 1) and a distal area that cantilevers away from the actuator arm 36. The second region 272 is also somewhat flat beam shaped. In a relaxed condition, the second region 272 is at an angle relative to the first region 270. The amount of the angle can be varied to suit the design requirements of the load beam 256. For example, suitable angles can be between six and twelve degrees. The beam body 260 can include one or more apertures that reduce the mass of the beam body 260, and many other features. For example, the beam body 260 can include the lifting feature 242 for load/unload operations, one or more limiters for better shock performance, and load beam stiffeners such as rails.

In this embodiment, near the bend 268, the distal area of the first region 270, and the proximal area of the second region 272, the beam body 260 includes a cut-out 274 in the top that defines the thickness of the first layer 262 and allows for the second layer 264 to be added to the first layer 262 without increasing or significantly increasing the overall thickness of the load beam 256. Accordingly, the depth of the cut-out 274 can be varied to suit the design requirements of the adjuster 240. As an example, the first layer 262 can have a thickness of between approximately 0.05 mm and 0.08 mm; the cut-out 274 can have a depth of between approximately zero and 0.08 mm; the second layer 264 can have a thickness of between approximately 0.02 mm and 0.08 mm; and the rest of the beam body 260 away from the cut-out 274 can have a thickness of between approximately 0.06 mm and 0.11 mm. The cut-out 274 can be created by etching the beam body 260 or some other manufacturing process.

Alternately, for example, the first layer 262 can be defined by a portion of the beam body 266 having a thickness that is equal to or greater than the thickness of the rest of the beam body 260. In these designs, no cut-out is utilized and the overall thickness of the adjuster 240 will be greater than the thickness of at least a portion of the beam body 260.

In FIG. 2B, the first layer 262 is shaped somewhat similar to a flat, partly bent "M" and is located at the bend 268 in the beam body 260. Alternately, for example, the first layer 262 can be located in a different position along the beam body 260 and can have a different shape. Somewhat similarly, the second layer 264 is shaped somewhat similar to a flat, partly bent "M" and is secured to the first layer 262 at the bend 268 in the beam body 260. However, the shape of the second layer 264 does not have to be the same as the shape and/or footprint as the first layer 262. In this embodiment, the layers 262, 264 are somewhat parallel.

It should be noted that one or both of the layers 262, 264 can have an alternate shape. For example, one or both of the layers 262, 264 could be rectangular shaped, oval shaped, circular shaped, semi-circular shaped, triangular shaped. Further, one or both of the layers 262, 264 could have a thickness or width that varies.

The securer 266 secures the layers 262, 264 together and ensures that the second layer 264 does not slide or separate from the first layer 262. For example, a suitable securer 266 can be an adhesive having a relatively high interlaminar shear resistance. Alternately, the securer 266 can be a weld.

The construction of and the materials used for the first layer 262 and the second layer 264 can be varied to adjust the characteristics of the adjuster 240. In one embodiment, the beam body 260, including the first layer 242 is made from a material having different material properties including a different coefficient of thermal expansion, and/or a different modulus of elasticity than the second layer 264. For example, the beam body 260 including the first layer 262 could be made of stainless steel and the second layer 264 could be made of Titanium, e.g. Ti-6Al-2Sn-4Zn-2Mo. In this example, each layer 262, 264 is made of a metal. Stainless steel has a coefficient of thermal expansion of approximately $17.0 \times 10^{-6}$ (mm/mm)/° C., and a modulus of elasticity of approximately 180 Gpa. Titanium has a coefficient of thermal expansion of approximately $7.7 \times 10^{-6}$ (mm/mm)/° C., and a modulus of elasticity of approximately 120 Gpa. In this example, (i) the coefficient of thermal expansion of the first layer 262 is approximately one hundred and twenty percent greater than the coefficient of thermal expansion of the second layer 264, and (ii) the modulus of elasticity of the first layer 262 is at least approximately fifty percent greater than the modulus of the second layer.

Alternately, other materials could be utilized for the first layer 262 and the second layer 264 to alter the characteristics of the adjuster 240. For example, materials could be utilized in the layers 262, 264 so that the coefficient of thermal expansion of the first layer 262 is at least approximately ten percent, twenty percent, fifty percent, seventy-five percent, or one hundred percent greater than the coefficient of thermal expansion of the second layer 264.

With this design, during a change in temperature, the layers 262, 264 expand and contract at different rates. This leads to a change in curvature and a change in gram load at a given Z-height as temperature changes. For example, as temperature decreases, the first layer 262 contracts a higher rate than the second layer 264. This causes the load beam 256 to bend more and the gram load to increase as temperature decreases. The increase in gram load maintains the slider 248 within the desired flying height range as temperatures decrease. Alternately, as temperature increases, the first layer 262 expands at a higher rate than the second layer 264. This causes the load beam 256 to have less of a bend and the gram load to decrease as temperature increases. This decrease in gram load maintains the slider 248 within the desired flying height range as temperatures increase.

Stated another way, the present invention utilizes a composite, laminated adjuster 240 with layers 262, 264 having different coefficients of thermal expansion and modulus of elasticity to automatically vary and control gram load as temperature changes and control the flying height over a relatively large range of temperatures. As a result thereof, the present invention thermally controls gram load to maintain the slider with a desired flying height range. The desired flying height range can vary. For example, the desired flying height range can be between approximately 0.3 micro-inches and 0.6 micro-inches. Therefore, the drive can be exposed to more critical environmental temperatures during operation and the performance and reliability is enhanced.

The characteristics of the adjuster 240 can be optimized by the material selection for the layers 262, 264, the first layer 262 thickness, the second layer 264 thickness, layer footprints, connection stresses (such as interlaminar shear for laminated structure), the location and size of adjuster 240.

For example, depending upon the design, for a twenty ° C. drop in temperature, the gram load can increase at least approximately 0.1 gr, at least approximately 0.2 gr, or at least approximately 0.3 gr.

Stated another way, depending upon the design, the adjuster 240 can increase the gram load at least approximately four percent for a twenty ° C. decrease in temperature. Alternately, the adjuster 240 can increase the gram load at least approximately seven percent for a twenty ° C. decrease in temperature. Still alternately, the adjuster 240 can increase the gram load at least approximately ten percent for a twenty ° C. decrease in temperature.

It should be noted that temperature change tends to deform the adjuster 240 without significantly changing in the spring rate in the load beam 256. Moreover, gram load sensitivity is changed as the distance of the adjuster 240 from the load dimple 258 is increased. In the embodiments provided herein, the adjuster 240 is positioned between approximately 7.5 mm and 10 mm away from the load dimple 258.

In an alternate embodiment, the beam body 260, including the first layer 262 is made from a material having a coefficient of thermal expansion that is less than the second layer 264. For example, materials could be utilized in the layers 262, 264 so that the coefficient of thermal expansion of the first layer 262 is at least approximately ten percent, twenty percent, fifty percent, seventy-five percent, or one hundred percent less than the coefficient of thermal expansion of the second layer 264. With this design, during a change in temperature, the first layer 262 expands and contracts at a slower rate than the second layer 264. This causes the load beam 256 to bend less and the gram load to decrease as temperature decreases. Alternately, as temperature increases, the first layer 262 expands at a slower rate than the second layer 264. This causes the load beam 256 to have more of a bend and the gram load to increase as temperature increases.

Figure 2C:
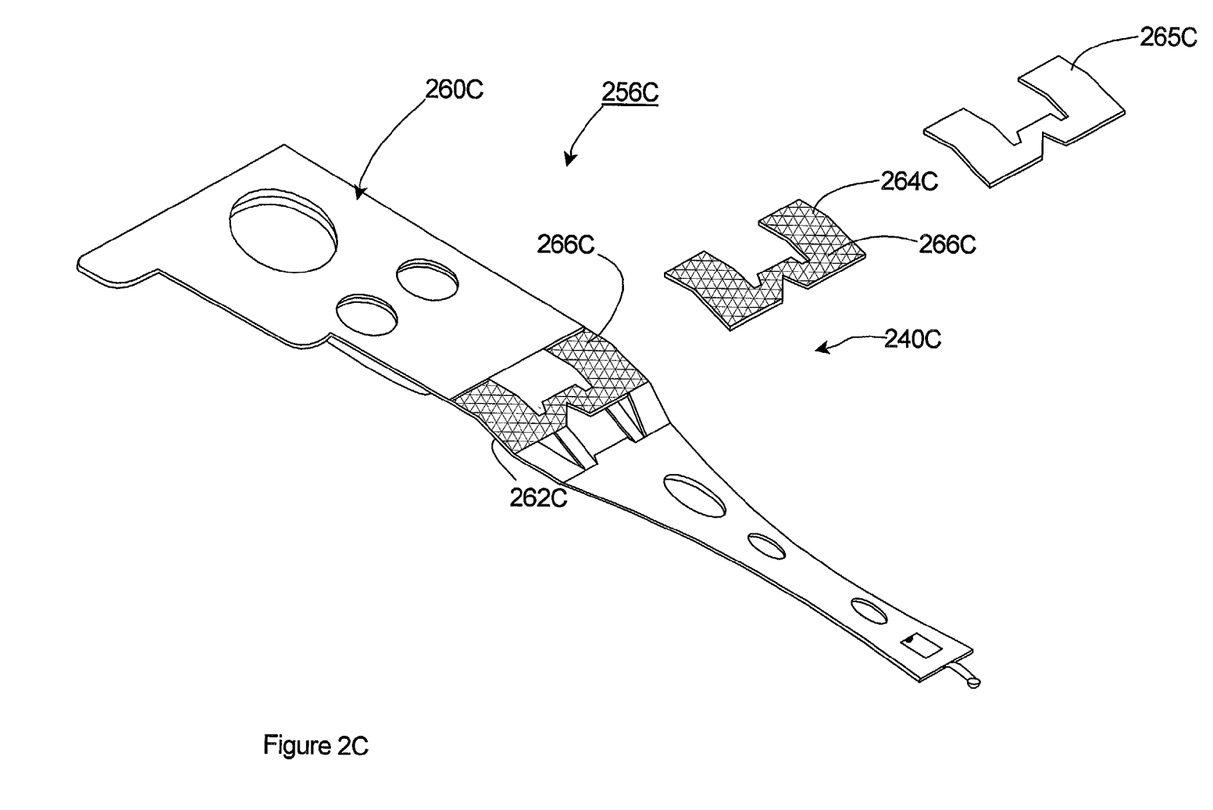
FIG. 2C is an exploded perspective view of another embodiment of a load beam having features of the present invention.

FIG. 2C illustrates an exploded perspective view of another embodiment of the load beam 256C including (i) the beam body 260C, a portion of which defines the first layer 262C, (ii) the second layer 264C, (iii) a third layer 265C and (iii) the securer 266C that secures the layers 262C, 264C, 265C together. In this embodiment, the first layer 262C, the second layer 264C, the third layer 265C and the securer 266C cooperate to define the adjuster 240C.

In this embodiment, the beam body 260C, including the first layer 242C is made from a material having different material properties including a different coefficient of thermal expansion than the second layer 264C and the third layer 265C. For example, materials could be utilized in the layers 262C, 264C, 265C so that the coefficient of thermal expansion of the first layer 262C is at least approximately ten percent, twenty percent, fifty percent, seventy-five percent, or one hundred percent greater than the coefficient of thermal expansion of the second layer 264C and the third layer 265C.

Further, the second layer 264C can be made from the same material as the third layer 265C or the second layer 264C can be made from a material having different material properties including a different coefficient of thermal expansion than the third layer 265C. For example, materials could be utilized in the layers 264C, 265C so that the coefficient of thermal expansion of the second layer 264C is at least approximately ten percent, twenty percent, fifty percent, seventy-five percent, or one hundred percent greater than the coefficient of thermal expansion of the third layer 265C.

With this design, during a change in temperature, the layers 262C, 264C, 265C expand and contract at different rates. For example, as temperature decreases, the first layer 262C contracts a higher rate than the second layer 264C, and the third layer 265C. This causes the load beam 256C to bend more and the gram load to increase as temperature decreases. Alternately, as temperature increases, the gram load decreases.

Figure 2D:
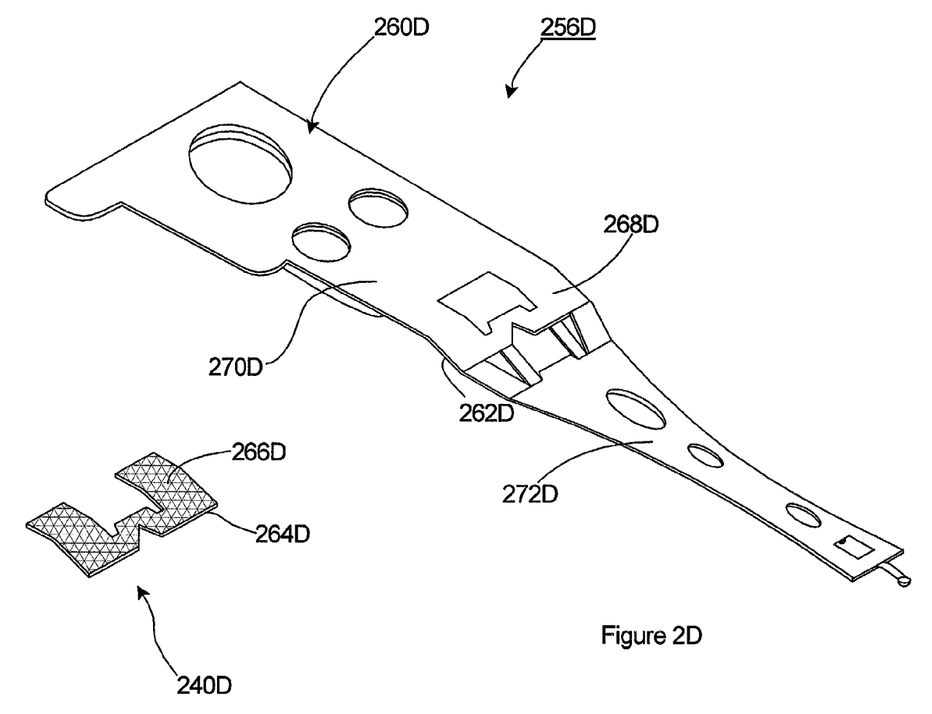
FIG. 2D is an exploded perspective view of yet another embodiment of a load beam having features of the present invention.

FIG. 2D is an exploded perspective view of yet another embodiment of the load beam 256D. In this embodiment, the load beam 256D includes (i) the beam body 260D, a portion of which defines the first layer 262D, (ii) the second layer 264D, and (iii) a securer 266D that secures the layers 262D, 264D together. In this embodiment, the first layer 262D, the second layer 264D and the securer 266D cooperate to define the adjuster 240D.

In this embodiment, near the bend 268D, the distal area of the first region 270D, and the proximal area of the second region 272D, the bottom side of the beam body 260D includes a cut-out (not shown) that defines the thickness of the first layer 262D and allows for the second layer 264D to be added to the first layer 262D without increasing or significantly increasing the overall thickness of the load beam 256D.

The beam body 260D, including the first layer 242D is made from a material having different material properties including a different coefficient of thermal expansion than the second layer 264D. For example, materials could be utilized in the layers 262D, 264D so that the coefficient of thermal expansion of the first layer 262D is at least approximately ten percent, twenty percent, fifty percent, seventy-five percent, or one hundred percent greater than the coefficient of thermal expansion of the second layer 264D. With this design, during a change in temperature, the first layer 262D contracts at a faster rate than the second layer 264D. This causes the load beam 256D to bend less and the gram load to decrease as temperature decreases. Alternately, as temperature increases, the first layer 262D expands at a faster rate than the second layer 264D. This causes the load beam 256D to have more of a bend and the gram load to increase as temperature increases.

In alternate embodiments, materials could be utilized in the layers 262D, 264D so that the coefficient of thermal expansion of the first layer 262D is at least approximately ten percent, twenty percent, fifty percent, seventy-five percent, or one hundred percent less than the coefficient of thermal expansion of the second layer 264D. With this design, during a change in temperature, the first layer 262D expands at a slower rate than the second layer 264D. This causes the load beam 256D to bend more and the gram load to increase as temperature decreases. Alternately, as temperature increases, the gram load decreases.

Figure 3A:
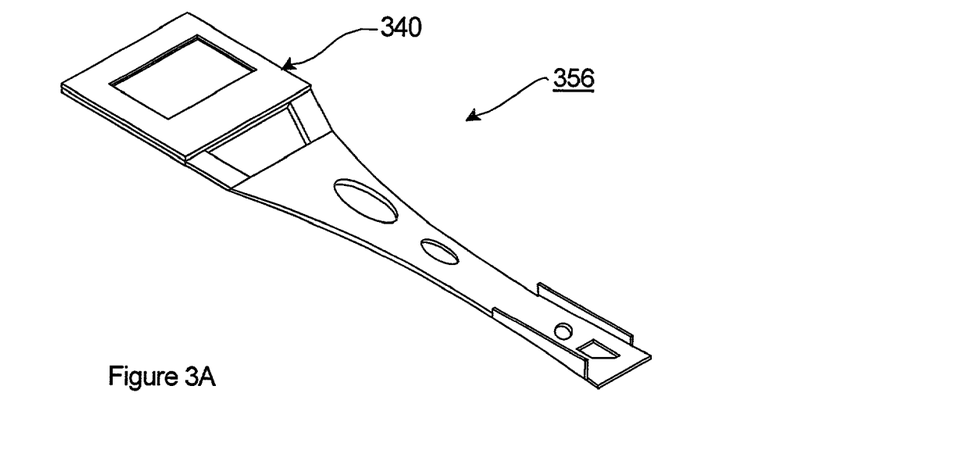
FIG. 3A is a perspective view of another embodiment of a load beam having features of the present invention.
Figure 3B:
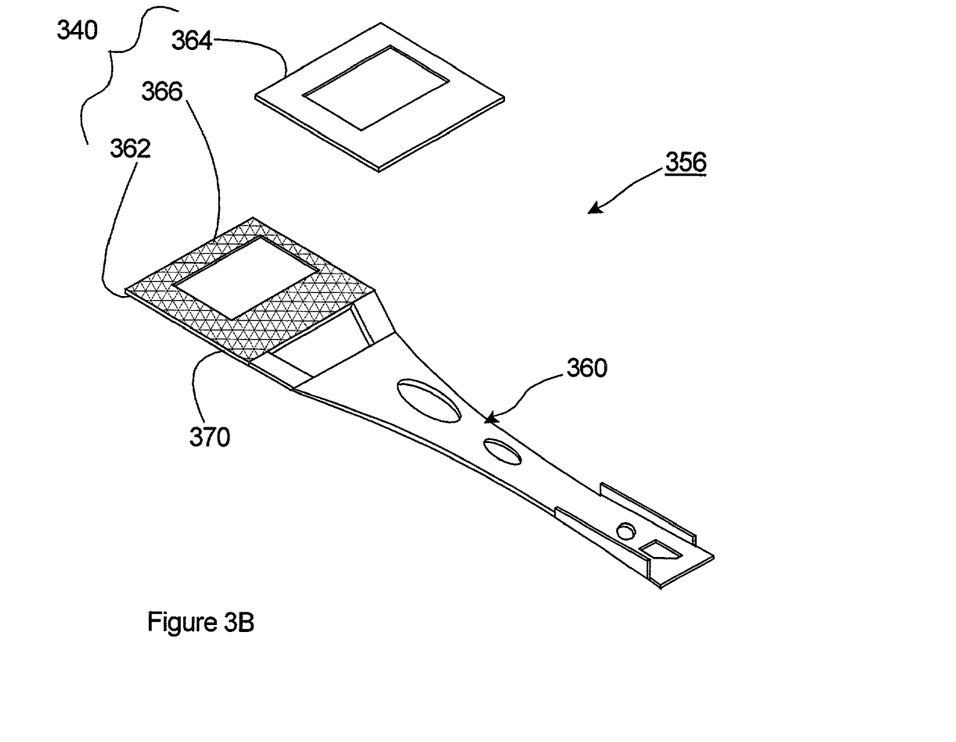
FIG. 3B is an exploded perspective view of the load beam of FIG. 3A.

FIG. 3A illustrates a perspective view of another embodiment of a load beam 356 and an adjuster 340 that is part of the load beam 356. FIG. 3B illustrates an exploded perspective view of the load beam 356 of FIG. 3A. In this embodiment, the load beam 356 includes a first layer 362, a second layer 364 and a securer 366 that are somewhat similar to the corresponding components described above. However, in this embodiment, each of the layers 362, 364 is generally flat rectangular frame shaped and each of the layers 362, 364 is in the first region 370 of the beam body 360.

Figure 4A:
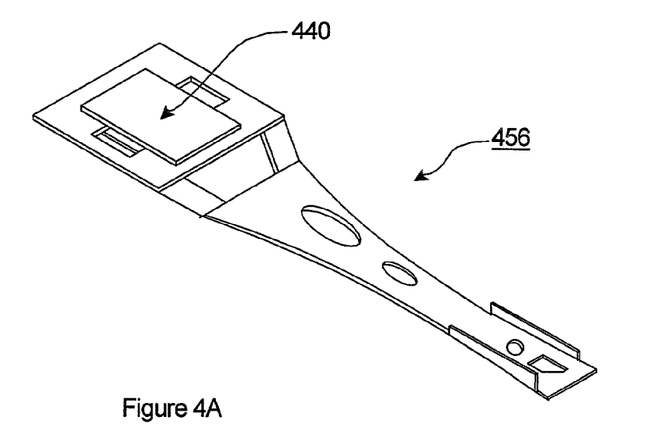
FIG. 4A is a perspective view of another embodiment of a load beam having features of the present invention.
Figure 4B:
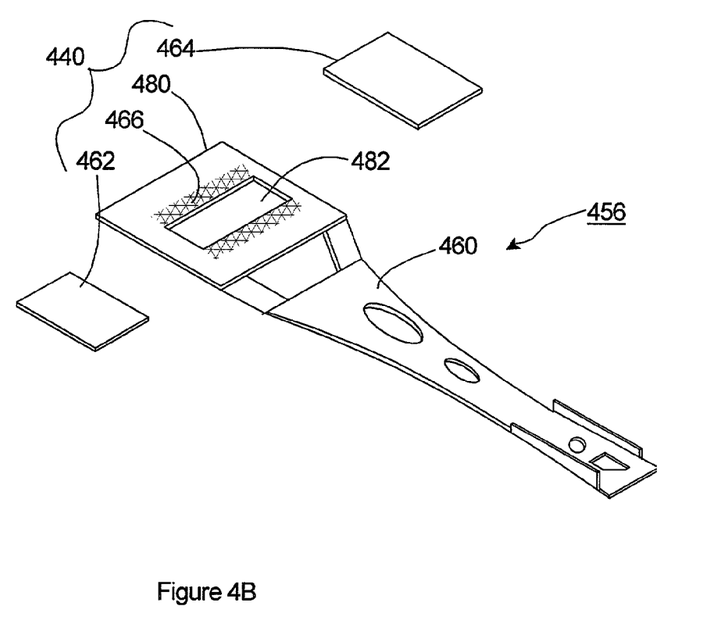
FIG. 4B is an exploded perspective view of the load beam of FIG. 4A.

FIG. 4A illustrates a perspective view of yet another embodiment of a load beam 456 and an adjuster 440 that is part of the load beam 456. FIG. 4B illustrates an exploded perspective view of the load beam 456 of FIG. 4A. In this embodiment, the load beam 456 includes a first layer 462, a second layer 464, an intermediate layer 480 and a securer 466 that secures the first layer 462 to the intermediate layer 480 and the second layer 464 to the intermediate layer 480. In this embodiment, the securer 466 is somewhat similar to the corresponding component described above. Further, the intermediate layer 480 is part of the beam body 460. However, in this embodiment, the intermediate layer 480 defines an opening 482, and the first layer 462 and the second layer 464 are generally rectangular plate shaped and are positioned on opposite sides of the opening 482 and the beam body 460.

In this embodiment, the first layer 462 is made from a material having different material properties including a different coefficient of thermal expansion, a different density, and/or a different modulus of elasticity than the second layer 464. For example, the first layer 462 and the beam body 460 could be made of stainless steel and the second layer 464 could be made of Titanium, e.g. Ti-6Al-2Sn-4Zn-2Mo. Alternately, for example, the first layer 462 could be made from a different material, such as aluminum, than the beam body 460.

Figure 5A:
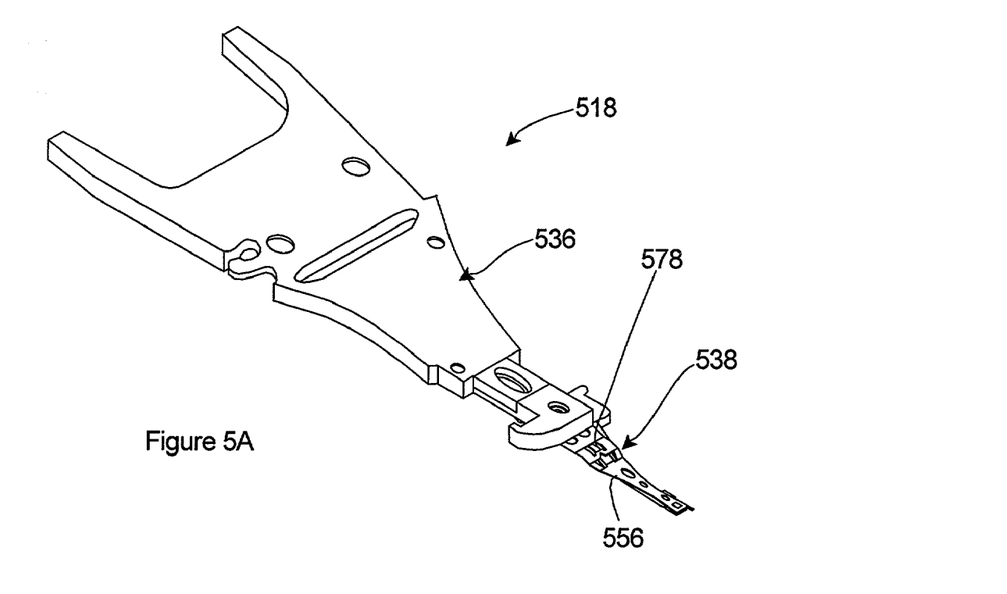
FIG. 5A is a perspective view of a head arm assembly having features of the present invention.

FIG. 5A is a perspective view of a head arm assembly 518 including an arm beam 536 and a head gimbal assembly 538 including a load beam 556 having features of the present invention. In this embodiment, the head arm assembly 518 includes an adjuster 540 that is incorporated in the arm beam 536 and a secondary adjuster 578 that is incorporated in the load beam 556. In this embodiment, the secondary adjuster 578 is similar to the adjuster 240 illustrated in FIGS. 2A and 2B and described above. It should be noted that in this embodiment, the head arm assembly 518 could be designed without the secondary adjuster 578.

Figure 5B:
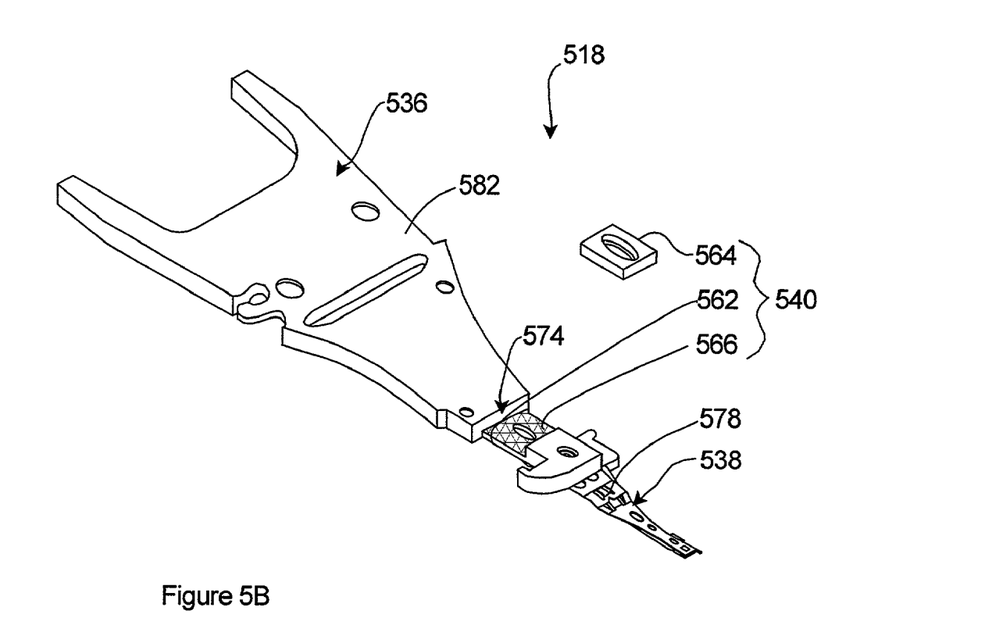
FIG. 5B is an exploded perspective view of the head arm assembly of FIG. 5A.

FIG. 5B is an exploded perspective view of the head arm assembly 518 of FIG. 5A. In FIG. 5B the arm beam 536 includes (i) an arm body 582, a portion of which defines a first layer 562, (ii) a second layer 564, and (iii) a securer 566 that secures the layers 562, 564 together. In this embodiment, the first layer 562, the second layer 564, and the securer 566 cooperate to define the adjuster 540. The securer 566 can be similar to the corresponding component described above.

The arm body 582 is generally flat beam shaped and includes a proximal end that is secured to an actuator hub 30 (illustrated in FIG. 1) and a distal end. The width the arm body 582 tapers from the proximal end towards the distal end.

In this embodiment, near the distal end of the arm beam 582, the arm beam 582 includes a cut-out 574 that defines the thickness of the first layer 562 and allows for the second layer 564 to be added to the first layer 562 without increasing or significantly increasing the overall thickness of the arm beam 582. Accordingly, the depth of the cut-out 574 can be varied to suit the design requirements of the adjuster 540. As an example, the first layer 562 can have a thickness of between approximately 0.2 mm and 1.0 mm; the cut-out 574 can have a depth of between approximately zero and 0.8 mm; the second layer 564 can have a thickness of approximately between 0.3 mm and 1.0 mm; and the rest of the arm body 582 away from the cut-out 574 can have a thickness of between approximately 0.5 mm and 1.0 mm. The cut-out 574 can be created by etching the arm body 582 or some other manufacturing process.

Alternately, for example, the first layer 562 can be defined by a region of the arm body 582 having a thickness that is equal to or greater than the thickness of the rest of the arm body 582. In these designs, no cut-out is utilized and the overall thickness of the adjustable area 540 will be greater.

In FIG. 5B, the first layer 562 is shaped somewhat similar to a flat, rectangle and is located near the distal end of the arm body 582. Alternately, for example, the first layer 562 can be located in a different position along the arm body 582 and can have a different shape. Somewhat similarly, the second layer 564 is shaped somewhat similar to a flat rectangle and is secured to the first layer 562 near the distal end. However, the shape of the second layer 564 does not have to be the same as the shape and/or footprint as the first layer 562.

In this embodiment, the arm body 582 including the first layer 562 is made from a material having different material properties including a different coefficient of thermal expansion, and/or a different modulus of elasticity than the second layer 564. For example, the arm body 582 including the first layer 562 could be made of aluminum and the second layer 564 could be made of Titanium, e.g. Ti-6Al-2Sn-4Zn-2Mo. Aluminum has a coefficient of thermal expansion of approximately $23.8 \times 10^{-6}$ (mm/mm)/° C., and a modulus of elasticity of approximately 70 Gpa. In this example, (i) the coefficient of thermal expansion of the first layer 562 is at least approximately two hundred and nine percent greater than the coefficient of thermal expansion of the second layer 564, and (ii) the modulus of elasticity of the first layer 562 is at least approximately forty-one percent less than the modulus of the second layer 564.

With this design, the layers 562, 564 expand and contract at different rates. This leads to a change in shape of the arm beam 536 and a change in gram load as the temperature changes.

It should be noted that for all of the embodiment discussed herein, the location of the adjuster, the thickness of the first layer and the thickness of the second layer can be varied to influence the characteristics of the adjuster. It should also be noted that in all of the illustrated embodiments, the second layer is positioned above the first layer and the load beam is bent downward. Alternately, this orientation can be reversed, for example, if the load beam is bent upward for positioning a slider adjacent a bottom side of the storage disk.

Figure 6A:
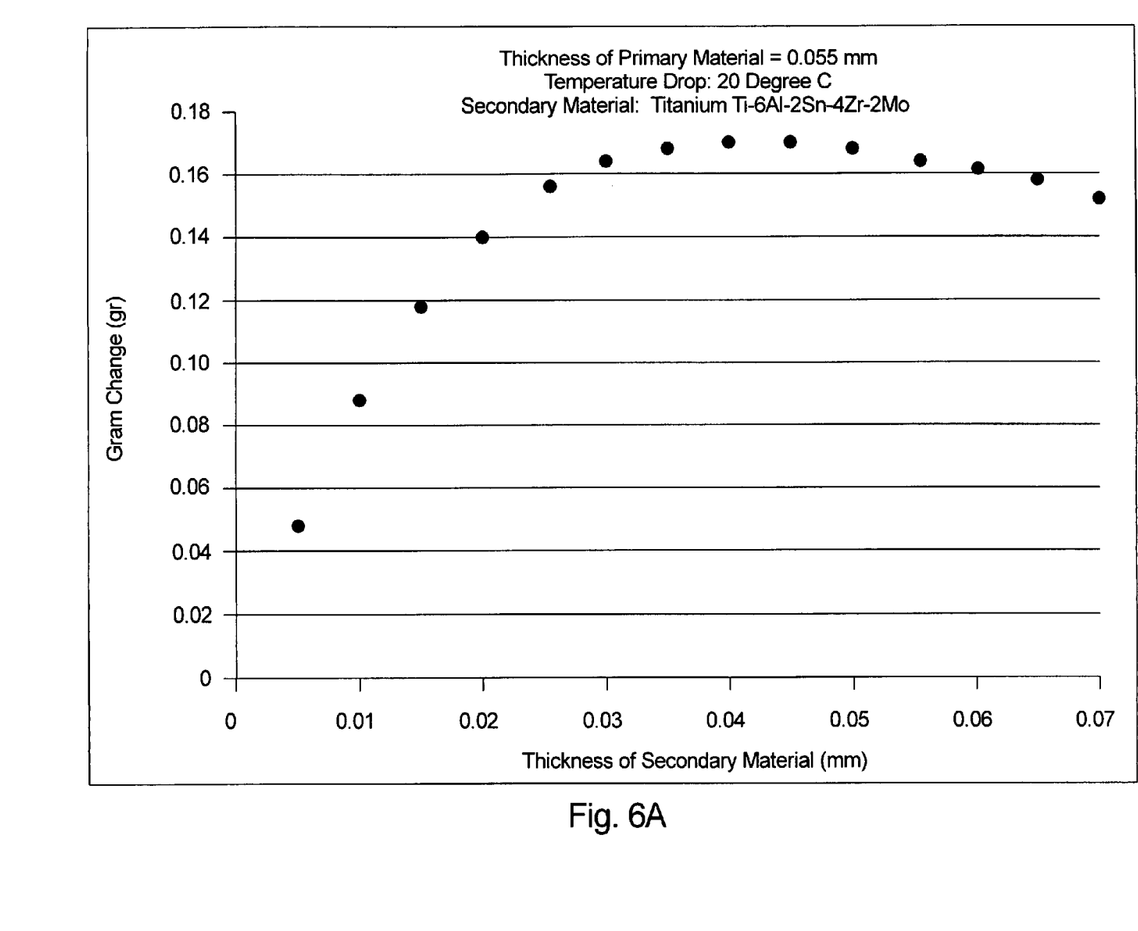
FIG. 6A is a graph that illustrates the gram change for a temperature drop of twenty ° C. versus thickness of second layer with a constant thickness of the first layer at 0.055 mm.

Finite element analysis was performed on a load beam having features of the load beam illustrated in FIGS. 4A and 4B. FIG. 6A illustrates the effects of second layer thickness on the amount of gram change at the slider that occurs during a 20° C. drop in temperature. Stated another way, FIG. 6A is a graph that illustrates the gram change for a temperature drop of twenty ° C. versus thickness of the second layer for the adjuster. For FIG. 6A, the first layer is stainless steel and has a thickness of 0.055 mm. The second layer is made of titanium Ti-6AL-2Sn-4Zr-2Mo. With this design, the greatest gram change occurs when the thickness of the second layer is between 0.04 and 0.045 mm.

Figure 6B:
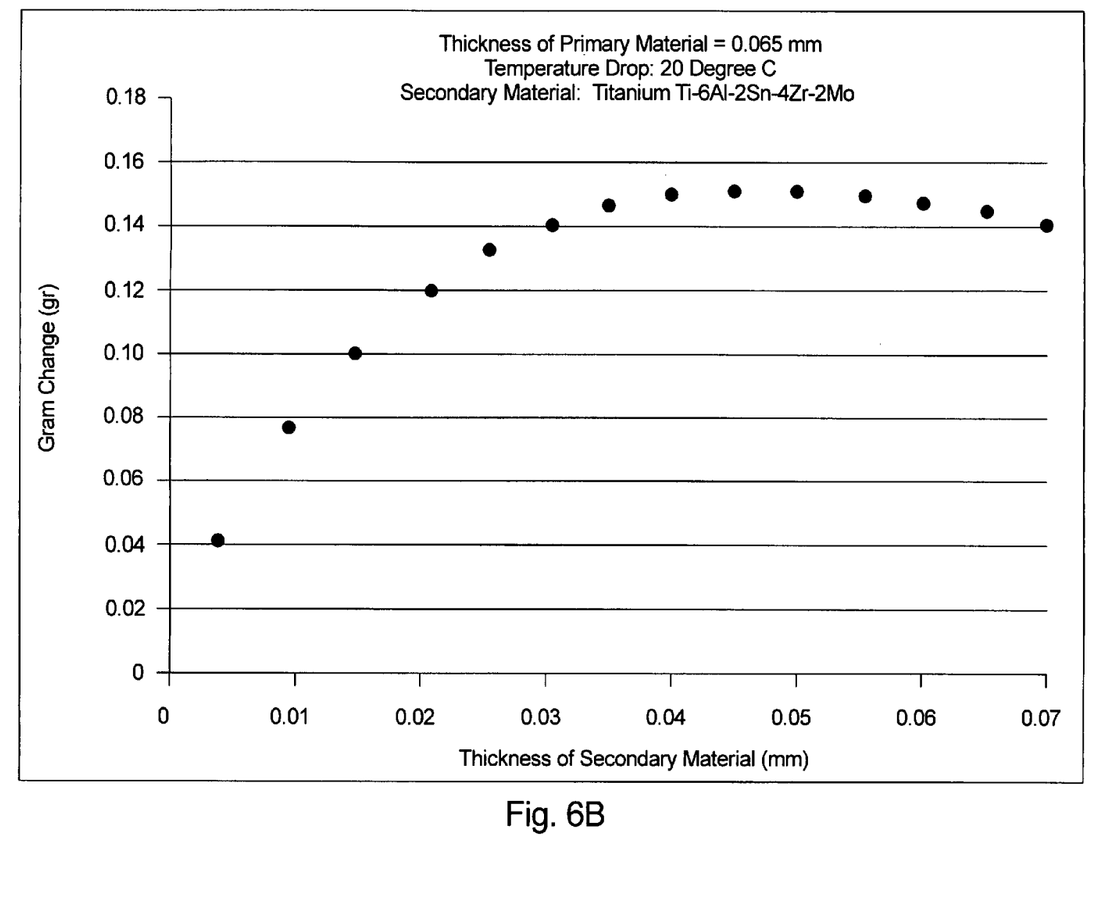
FIG. 6B is a graph that illustrates the gram change for a temperature drop of twenty ° C. versus thickness of second layer with a constant thickness of the first layer at 0.065 mm.

FIG. 6B also illustrates the effects of second layer thickness on the amount of gram change that occurs during a 20° C. drop in temperature. For FIG. 6B, the first layer is stainless steel and has a thickness of 0.065 mm. The second layer is made of titanium Ti-6AL-2Sn-4Zr-2Mo.

FIGS. 6A and 6B illustrate that the amount of gram change can be varied by increasing or decreasing the thickness of the second layer. These figures illustrate that an increase in the thickness of the second layer may initially increase the design effectiveness until it reaches a critical value.

In FIGS. 6A and 6B, the maximum gram sensitivity is equal to 0.17 gr/20° C. and 0.15 gr/20° C., respectively. Further, the effect of the securer was not included in this analysis.

Figure 6C:
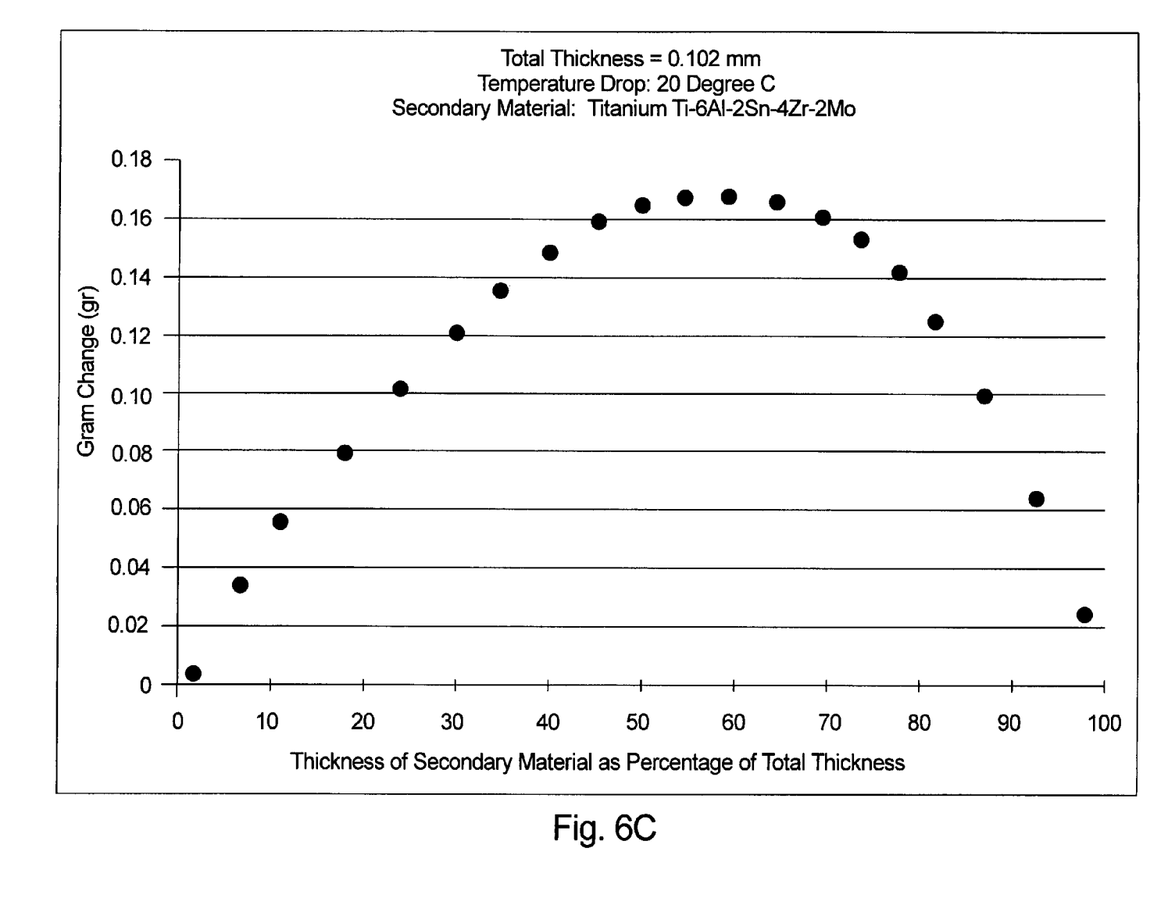
FIG. 6C is a graph that illustrates the gram change for a temperature drop of twenty ° C. versus thickness of the second layer as percentage of total thickness.

FIG. 6C is a graph that illustrates the gram change for a temperature drop of twenty ° C. versus thickness of second layer as percentage of total thickness. For FIG. 6C, the total thickness of the first and second layers is kept constant at 0.102 mm. The first layer is made of stainless steel and the second layer is made of titanium Ti-6AL-2Sn-4Zr-2Mo. As an example, FIG. 6C illustrates that if the second layer has 56 percent of the total thickness, a 20° C. drop in temperature will result in a maximum increase in gram load of approximately 0.18 grams.

While the designs provided herein are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
   a drive housing;
   a storage disk coupled to the drive housing; and
   a head arm assembly coupled to the drive housing, the head arm assembly including an adjuster and a slider coupled to the adjuster, the adjuster including a first layer and an adjacent second layer, the first layer having a first composition with a first material property, the second layer having a second composition with a second material property that is different than the first material property, the adjuster applying a gram load to the slider that at least partially depends upon the temperature of the layers.

2. The disk drive of claim 1 wherein the first layer has a coefficient of thermal expansion that is greater than a coefficient of thermal expansion of the second layer.

3. The disk drive of claim 1 wherein the first layer has a coefficient of thermal expansion that is at least approximately 25% greater than a coefficient of thermal expansion of the second layer.

4. The disk drive of claim 1 wherein the first layer has a modulus of elasticity that is different than a modulus of elasticity of the second layer.

5. The disk drive of claim 1 wherein the head arm assembly includes a load beam, and the adjuster is incorporated as part of the load beam.

6. The disk drive of claim 5 further comprising a second adjuster that adjusts the gram load that is applied to the slider, and wherein the head arm assembly includes an arm beam, and the second adjuster is incorporated as part of the arm beam.

7. The disk drive of claim 1 wherein the adjuster adjusts the gram load that is applied to the slider when the temperature of the adjuster changes.

8. The disk drive of claim 1 wherein the adjuster is non-electrically actuated.

9. The disk drive of claim 1 wherein the first layer is secured to the second layer.

10. The disk drive of claim 1 wherein each layer is formed from a different composition of metal.

11. The disk drive of claim 1 wherein a thickness of the first layer is approximately the same as a thickness of the second layer.

12. The disk drive of claim 1 wherein the a thickness of the first layer is different than a thickness of the second layer.

13. A disk drive comprising:
    a drive housing;
    a storage disk coupled to the drive housing; and
    a head arm assembly coupled to the drive housing, the head arm assembly including a non-electrically actuated adjuster and a slider coupled to the adjuster, the adjuster adjusting the gram load that is applied to the slider when the temperature of the adjuster changes.

14. The disk drive of claim 13 wherein the adjuster includes a first layer and an adjacent second layer, the first layer having a first composition with a first material property, the second layer having a second composition with a second material property that is different than the first material property.

15. The disk drive of claim 14 wherein the first layer has a coefficient of thermal expansion that is greater than a coefficient of thermal expansion of the second layer.

16. The disk drive of claim 14 wherein the first layer has a coefficient of thermal expansion that is at least approximately 25% greater than a coefficient of thermal expansion of the second layer.

17. The disk drive of claim 14 wherein the first layer has a modulus of elasticity that is different than a modulus of elasticity of the second layer.

18. The disk drive of claim 14 wherein the first layer is secured to the second layer.

19. The disk drive of claim 14 wherein each layer is formed from a different composition of metal.

20. The disk drive of claim 14 wherein a thickness of the first layer is approximately the same as a thickness of the second layer.

21. The disk drive of claim 14 wherein the a thickness of the first layer is different than a thickness of the second layer.

22. The disk drive of claim 13 wherein the head arm assembly includes a load beam, and the adjuster is incorporated as part of the load beam.

23. The disk drive of claim 22 further comprising a second adjuster that adjusts the gram load that is applied to the slider, and wherein the head arm assembly includes an arm beam, and the second adjuster is incorporated as part of the arm beam.

24. The disk drive of claim 23 wherein the second adjuster adjusts the gram load that is applied to the slider when the temperature of the second adjuster changes.

25. A method for maintaining a slider within a desired flying height range as temperature changes within a disk drive, the method comprising the steps of:
    providing a head arm assembly including the slider and an adjuster, the adjuster including a first layer and an adjacent second layer, the first layer having a first composition with a first material property, the second layer having a second composition with a second material property that is different than the first material property; and
    applying a gram load to the slider with the adjuster, the gram load that is applied at least partially depending upon the temperature of the layers.

26. The method of claim 25 wherein the step of providing includes the first layer having a coefficient of thermal expansion that is greater than a coefficient of thermal expansion of the second layer.

27. The method of claim 25 wherein the step of providing includes the first layer having a coefficient of thermal expansion that is at least approximately 25% greater than a coefficient of thermal expansion of the second layer.

28. The method of claim 25 wherein the step of providing includes the first layer having a modulus of elasticity that is different than a modulus of elasticity of the second layer.

29. The method of claim 25 wherein the step of applying includes using the adjuster to dynamically adjust the gram load that is applied to the slider as the temperature of the adjuster changes.

30. The method of claim 25 wherein the step of providing includes incorporating the adjuster as part of a load beam of the head arm assembly.

31. The method of claim 30 further comprising the steps of providing a second adjuster that adjusts the gram load that is applied to the slider, and incorporating the second adjuster as part of an arm beam of the head arm assembly.

32. The method of claim 25 wherein the adjuster is non-electrically actuated.

33. The method of claim 25 wherein the step of providing includes securing the first layer to the second layer.

34. A method for maintaining a slider within a desired flying height range as temperature changes within a disk drive, the method comprising the steps of:
 providing a head arm assembly including the slider and an non-electrically actuated adjuster; and
 adjusting the gram load that is applied to the slider with the adjuster as the temperature of the adjuster changes.

35. The method of claim 34 wherein the step of providing includes providing the adjuster with a first layer and an adjacent second layer, the first layer having a first composition with a first material property and the second layer having a second composition with a second material property that is different than the first material property.

36. The method of claim 35 wherein the first layer has a coefficient of thermal expansion that is greater than a coefficient of thermal expansion of the second layer.

37. The method of claim 35 wherein the first layer has a modulus of elasticity that is different than a modulus of elasticity of the second layer.

38. The method of claim 35 wherein the first layer is secured to the second layer.

39. The method of claim 35 wherein each layer is formed from a different composition of metal.

40. The method of claim 35 wherein the step of providing includes incorporating the adjuster as part of a load beam of the head arm assembly.

41. The method of claim 40 wherein the step of a providing includes providing a second adjuster that adjusts the gram load that is applied to the slider, the second adjuster being incorporated as part of an arm beam of the head arm assembly.

* * * * *

UNITED STATES PATENT AND TRADEMARK OFFICE
CERTIFICATE OF CORRECTION

| | |
|---|---|
| PATENT NO. | : 7,068,470 B1 |
| APPLICATION NO. | : 10/092453 |
| DATED | : June 27, 2006 |
| INVENTOR(S) | : Hadian et al. |

It is certified that error appears in the above-identified patent and that said Letters Patent is hereby corrected as shown below:

Col. 13, Ln 30
In claim 34, before the word -- non-electrically --, replace "an" with -- a --.

Signed and Sealed this

Fifth Day of September, 2006

JON W. DUDAS
*Director of the United States Patent and Trademark Office*